United States Patent [19]
Hodson et al.

[11] Patent Number: 5,461,910
[45] Date of Patent: Oct. 31, 1995

[54] FLUID FLOW DIRECTION AND VELOCITY MONITOR

[75] Inventors: Price R. Hodson, Glen Ellyn; Federico Chu, Glenview; Arnold Buchanan, Deerfield; Robert E. Montividas, Hanover Park, all of Ill.

[73] Assignee: Alnor Instrument Company, Skokie, Ill.

[21] Appl. No.: 261,285

[22] Filed: Jun. 16, 1994

[51] Int. Cl.⁶ .................................................. G01F 1/68
[52] U.S. Cl. ................... 73/170.12; 73/202.5; 73/204.16
[58] Field of Search ........................... 73/170.12, 204.16, 73/204.23, 202.5

[56] References Cited

U.S. PATENT DOCUMENTS

| | | | |
|---|---|---|---|
| 2,689,932 | 9/1954 | Hornfeck | 318/28 |
| 3,196,679 | 7/1965 | Howland | 73/204 |
| 4,542,650 | 9/1985 | Renken | 73/204 |
| 4,787,251 | 11/1988 | Kolodjski | 73/755 |
| 4,885,937 | 12/1989 | Tanaka et al. | 73/170.12 |
| 4,911,009 | 3/1990 | Maeda | 73/204.25 |
| 4,944,035 | 7/1990 | Aagardl et al. | 73/204.16 |
| 5,108,193 | 4/1992 | Furubayashi | 374/164 |
| 5,218,866 | 6/1993 | Phillips et al. | 73/170.12 |

*Primary Examiner*—Richard Chilcot
*Assistant Examiner*—Harshad Patel
*Attorney, Agent, or Firm*—Skadden, Arps, Slate, Meagher & Flom

[57] ABSTRACT

A fluid flow detection monitor (80), particularly useful in monitoring pressure differentials between a controlled environment and its surroundings, includes a heat source (1) situated between an upstream and downstream thermal sensor (2,3) within a channel (5). The electrical resistance of the downstream sensor varies as the downstream sensor is heated from fluid carried past the heat source. Circuitry is used to detect the electrical resistance differential between the thermal sensors, thereby detecting the presence of fluid flow.

6 Claims, 3 Drawing Sheets

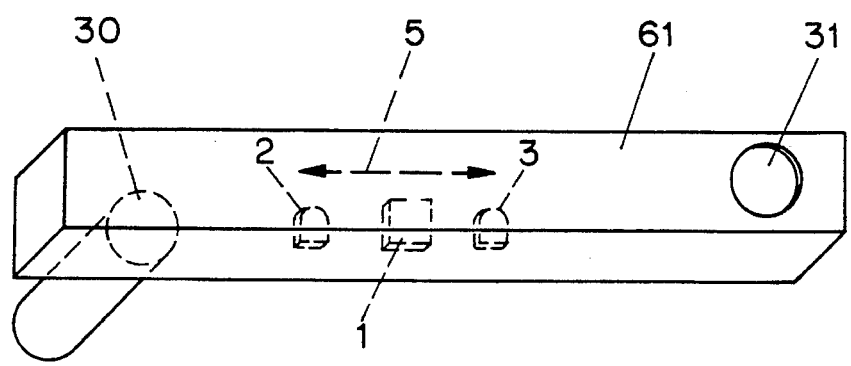
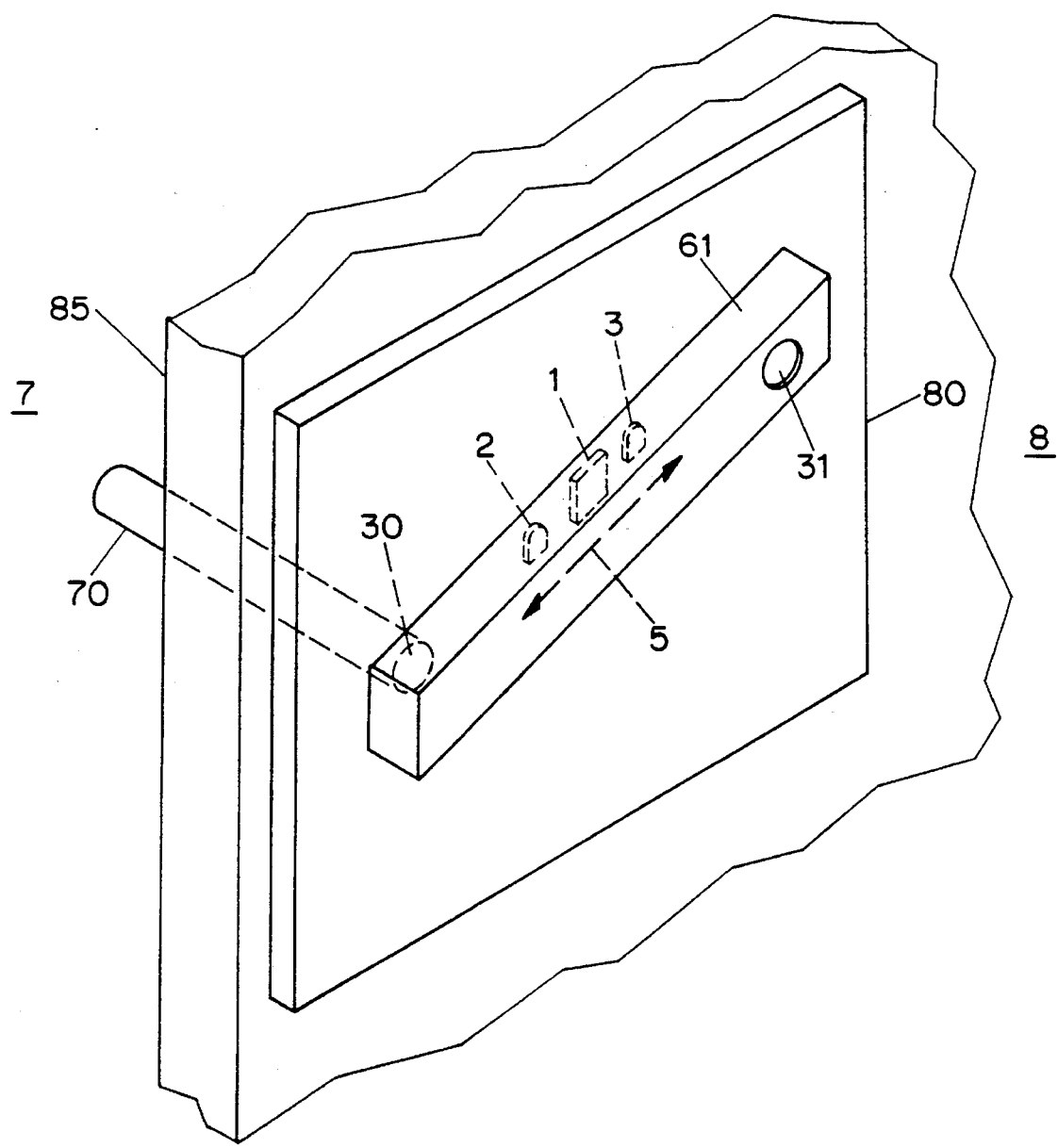

FLUID FLOW DIRECTION AND VELOCITY MONITOR

SPECIFICATION

FIELD OF THE INVENTION

This invention relates generally to fluid flow direction detectors, and more specifically to a ventilation related monitor for detecting the direction and velocity of gas flow in a tube or channel connecting two rooms.

BACKGROUND OF THE PRESENT INVENTION

A number of flow measurement and detection arrangements have been developed over the years. These devices may be generally categorized as one-, two- and three-element devices. Single sensor devices can calculate fluid velocity, but are generally not suitable for determining fluid flow direction.

Two- and three-element devices generally operate on the principle of adding heat to a flowing fluid and measuring the heat transfer functions of sensors placed along the fluid flow stream. The difference between the heat transfer functions of the upstream and downstream sensors is used to calculate flow direction and velocity.

For example, U.S. Pat. No. 4,787,251 reports a two-element configuration. The configuration in U.S. Pat. No. 4,787,251 requires that both sensors produce a significant thermal wake. To produce these thermal wakes, both sensors are typically 30°–100° C. above that of the surrounding fluid temperature, a significant power requirement. The thermal wake is sensed by the downstream sensor. This two-element arrangement also requires thermally insulated flow sensors and greater complexity in the circuitry used to measure the electrical resistance or heat transfer functions of the thermal sensors. Use of the sensors as both thermal sensors and heating elements also results in unnecessary power dissipation in the measuring circuit. Additionally, the heat added by the downstream element is not utilized.

U.S. Pat. No. 3,196,679 describes a three-element configuration which uses a heated element situated between an upstream and a downstream thermal sensor. This three-element configuration requires a high heat source and relies on the mechanical movement of spring-type thermal sensors. Because spring-type thermal sensors are not appropriate for detecting small temperature differentials of a surrounding gas flow, this configuration is not suitable for use in measuring low volume gas flow.

Thus, there exists a need for an inexpensive, reliable, and low-power fluid flow direction and velocity monitor for use in laboratories, hospitals and other ventilation applications where airborne contaminants must be isolated within or outside of a controlled space. Reliable fluid flow direction monitors may be used to maintain minimal pressure differentials between the controlled and non-controlled spaces. Reliable detection of minimal pressure differentials allows for the use of lower volume air supply systems, therefore, reducing energy requirements.

SUMMARY OF THE INVENTION

To detect whether fluid is flowing in a preselected direction within a fluid flow channel, a heat source is situated between two thermal sensors. The heat source and thermal sensors are positioned within the fluid flow channel so that one thermal sensor is always downstream from the heat source when fluid flow is present. The downstream thermal sensor will thus be exposed to greater heat than the upstream thermal sensor. This exposure heats the downstream sensor and varies its electrical resistance. The difference between the electrical resistance of the upstream and downstream thermal sensors is monitored and used to determine whether fluid is flowing in the pre-selected direction.

To monitor the electrical resistance values of the thermal sensors, each sensor is electrically coupled to opposite arms of a Wheatstone bridge. Voltages at cross-nodes of the Wheatstone bridge are amplified by a differential amplifier. The amplified signal is compared to a voltage level, preferably a user-selected voltage level, to determine whether the fluid in the fluid flow channel is flowing in the preselected direction.

It is an object of the invention to provide a simple, fluid flow direction monitor with low power requirements.

It is another object of this invention to provide a fluid flow direction monitor for determining the direction of fluid flow utilizing a single heating element and two thermal sensor elements, wherein the heating element is located between the two thermal sensor elements such that the downstream sensor will be heated to a higher temperature than the upstream sensor.

It is another object of this invention to provide a fluid flow detection monitor utilizing a single heating element and two thermal sensor elements located in a channel connecting two rooms or spaces. The fluid flow direction monitor is used to verify that one of the rooms or spaces is maintained at a higher pressure than the other space. Such pressure differentials are critical in hospital operating rooms, isolation rooms, and clean room environments.

It is a further object of this invention to provide a fluid flow velocity monitor for determining the velocity of fluid flow within the fluid flow channel. A pulse circuit is used to provide a pulse of power to the heating element. A timing circuit is connected to the thermal sensors to measure the delay between the pulsing of the heating element and the change in electrical resistance of the downstream thermal sensor. The fluid flow velocity may then be calculated by knowing the delay and the distance between the heating element and the downstream thermal sensor.

BRIEF DESCRIPTION OF THE DRAWINGS

For a more complete understanding of the present invention, reference is made to the following Detailed Description taken in conjunction with the accompanying drawings in which:

FIG. 1 is a perspective view, with a cutaway portion, showing a fluid flow detection monitor including the placement of the thermal sensors and the heating element according to the principles of the present invention;

FIG. 2 is a perspective view, showing a directional pressure monitor constructed according to the principles of the present invention;

DETAILED DESCRIPTION

Figure 3:
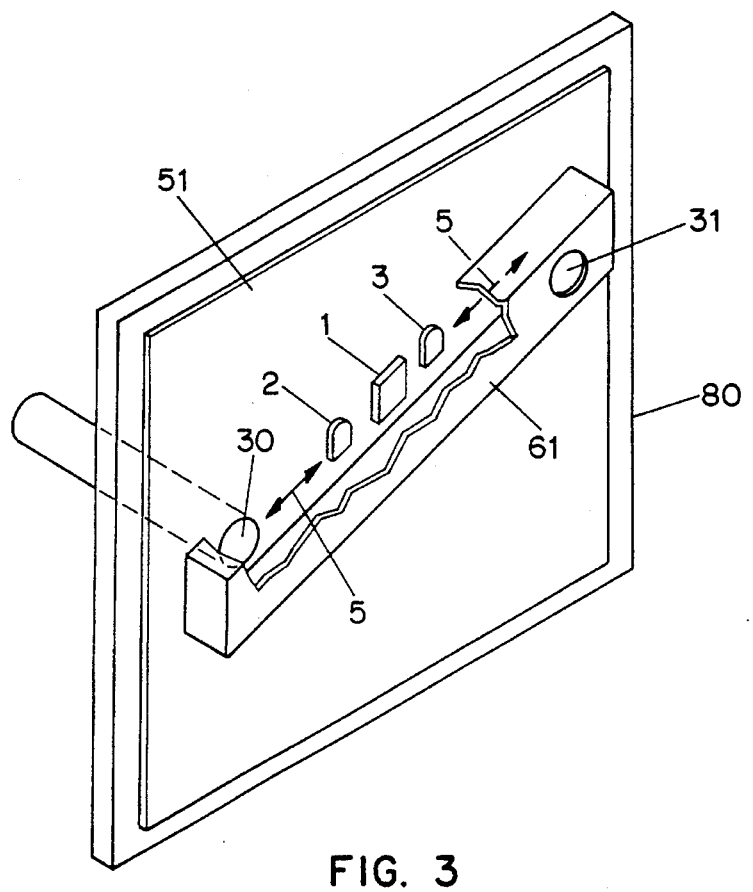
FIG. 3 is a sectional view, showing a directional monitor constructed according to the present invention.

Preferred embodiments of the present invention will now be described with reference to the drawings.

Referring to FIG. 1, the fluid flow direction monitor includes a fluid flow channel 5 having a first opening 30 and second opening 31. A first thermal sensor 2 and a second thermal sensor 3 are disposed within the fluid flow channel 5. A heating element 1 is disposed between the thermal sensors 2 and 3, and heated above ambient temperature. Fluid flowing over the heating element 1 will be heated and will flow over one of the thermal sensors: either 2 or 3, depending upon which sensor is downstream from heating element 1, and heat the downstream thermal sensor. The fluid flow channel 5 need not be horizontal and has been implemented at a 30 to 45 degree angle relative to horizontal.

The heating element 1 is typically a resistor through which a current is driven, thereby causing the resistor to heat the surrounding fluid flow above ambient temperature. Typically the resistor is between about 530 and 630 ohms and preferably between 608 and 620 ohms. In a preferred embodiment, the heating resistor is powered by a transformer with approximately 125 mW of power. This resistor heats the fluid that comes in contact with it. The resistor is typically maintained at approximately 10°–50° C. above the ambient fluid temperature, and preferably 10°–30° C. above the ambient fluid temperature. The electrical resistance of each of thermal sensors 2 and 3 varies rapidly and predictably as the temperature of the sensor increases. Preferably, thermal sensors 2 and 3 are thermistors. When the downstream thermal sensor is heated by the heated fluid flowing past it, its electrical resistance decreases. Thermal sensors 2 and 3 are connected to circuitry that determines whether the electrical resistance of the thermal sensor that should be downstream is greater than the electrical resistance of the thermal sensor that should be upstream. In a preferred embodiment, the magnitude of the difference in thermal sensor resistance is user selectable and is typically in the range of 100 to 600 ohms. The presence of this difference in electrical resistance indicates fluid flow in the preselected direction. When the circuitry does not detect this difference, in preferred embodiments, the fluid flow direction monitor produces a sensible output, typically a sound or light signal.

FIG. 2 illustrates a fluid flow direction monitor constructed according to the principles of the present invention. The fluid flow direction monitor includes heating element 1, and thermistors 2 and 3, mounted within fluid flow channel 5. Fluid flow channel includes a first opening 30 and second opening 31. The illustration shows two rooms, 7 and 8. Fluid flow direction monitor 80 is mounted on wall 85 in room 8. Flow tube 70 connects the first opening 30 of fluid flow channel 5 to room 7. Each room has a nominal pressure. Fluid may flow to or from rooms 7 and 8 through fluid flow channel 5 and flow tube 70. The direction of fluid flow through channel 5 will be toward the room with the lower pressure.

FIG. 3 illustrates a fluid flow direction monitor constructed in accordance with a preferred embodiment of the present invention. A printed circuit board 51 forms one face of the fluid flow channel 5. A first and second thermal sensor, 2 and 3 respectively, are thermistors mounted on the printed circuit board 51 within the fluid flow channel 5. The heating element 1 is a resistor, mounted on the printed circuit board 51 between the thermal sensors 2 and 3. The heating element 1 and thermal sensors 2 and 3 are preferably standard through-hole, leaded, components, but could alternatively be surface mounted. Channel cover 61 forms the opposing three faces of fluid flow channel 5 allowing fluid to flow through fluid flow channel 5, past the thermal sensors 2 and 3 and heating element 1.

Figure 4:
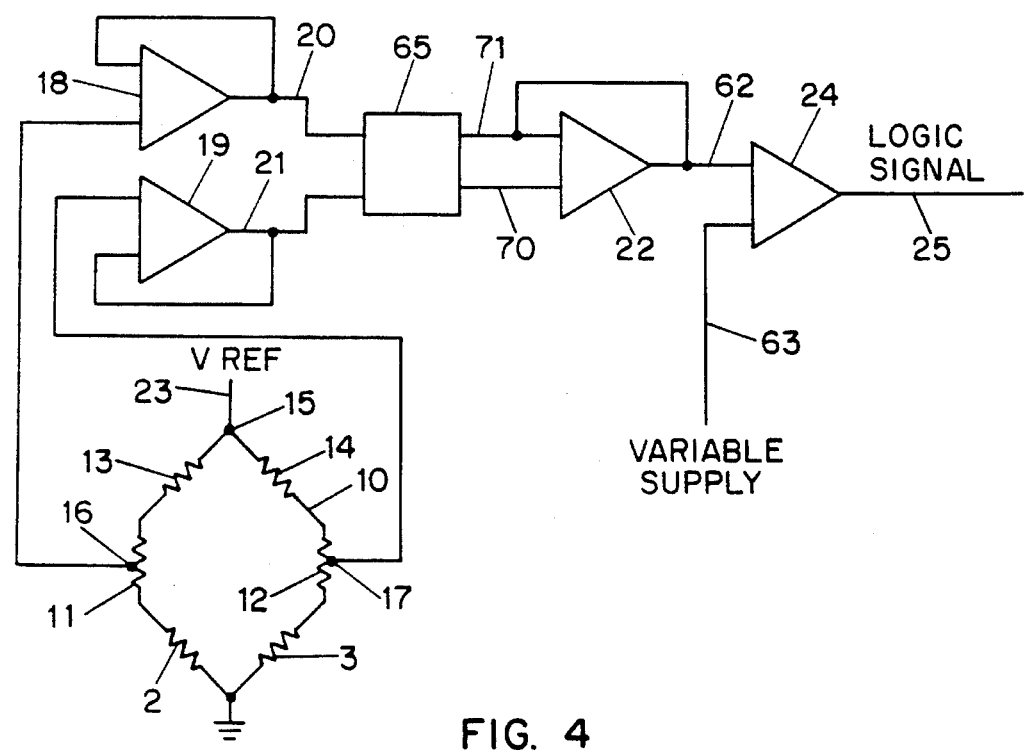
FIG. 4 is a simplified electrical schematic diagram of a monitor constructed in accordance with the present invention.

FIG. 4 illustrates a simplified electrical schematic diagram of a circuit constructed in accordance with a preferred embodiment of the present invention. The thermal sensors 2 and 3 are each part of separate legs of a single bridge circuit 10. Bridge circuit 10 is formed from thermal sensors 2 and 3, resistors 13 and 14, and potentiometers 11 and 12. The potentiometers 11 and 12 are used to compensate for component inaccuracies and may be eliminated by improved component tolerances. A bridge voltage 23 is applied to node 15 of the bridge circuit 10. Voltage measurements are taken at bridge nodes 16 and 17 by voltage followers 18 and 19. The output voltages 20 and 21, of voltage followers 18 and 19, are electrically connected to dip switch 65. Dip switch 65 is used to preselect the direction in which fluid flow may be detected by setting a selected output voltage 70 and a nonselected output voltage 71 from output voltages 20 and 21. The selected 70 and nonselected 71 output voltages are electrically connected to differential amplifier 22, which amplifies the difference of the selected output voltage minus the nonselected output voltage and produces a differential voltage 62. Comparison amplifier 24 compares the differential voltage 62 to reference voltage 63. Reference voltage 63 can be either preset or user selectable. Comparison amplifier 24 then produces a logic signal 25, indicating whether there is fluid flow in the downstream direction.

In a preferred embodiment, logic signal 25 is electrically connected to a programmable logic chip which controls a audible alarm and LEDs to signal a lack of flow in the preselected direction.

Figure 5:
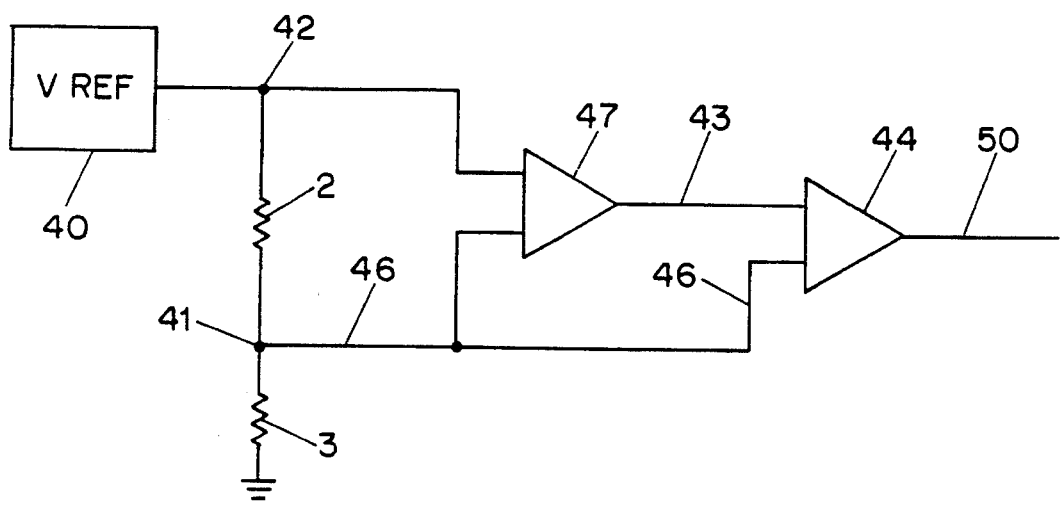
FIG. 5 is a simplified electrical schematic diagram of a second embodiment of the present invention.

FIG. 5 shows an alternate embodiment of the invention. Thermal sensors 2 and 3 are connected in series, but are not a part of a bridge circuit. The thermal sensors 2 and 3 form a junction 41. Device 40 provides a stable reference voltage and is electrically connected to the thermal sensor in series at junction 42. A first operational amplifier 47 is connected to junctions 41 and 42 and produces an output 43 proportional to the voltage loss across thermal sensor 2. Temperature across thermal sensor 3 is available by measuring the voltage 46 at junction 41. A second operational amplifier 44 compares the differential voltage of the output 43 and voltage 46 of junction 41 and outputs a logic signal 50, indicating whether fluid is flowing in the desired direction.

Figure 6:
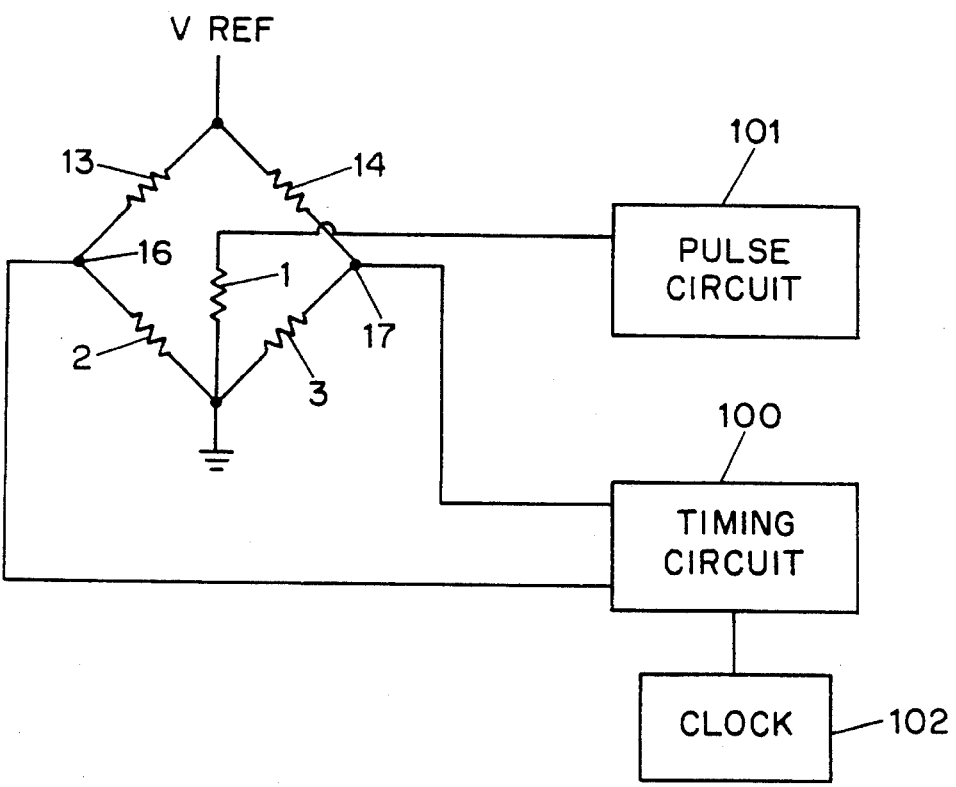
FIG. 6 is a simplified electrical schematic diagram of a velocity monitor constructed in accordance with the present invention.

FIG. 6 illustrates an electrical schematic diagram of a circuit constructed in accordance with the invention. Heating element 1 is heated by a pulse of voltage generated by pulse generating circuit 101. Heating element 1 heats the fluid that comes in contact with it, causing the downstream thermal sensor to be heated. Thermal sensors, 2 and 3, generate an interrupt when heated. When the pulse generating circuit 101 pulses heating element 1, the timing circuit 100 begins counting clock ticks produced by clock 102, until an interrupt generated by the downstream thermal sensor, either 2 or 3, interrupts the timing circuit 100. Fluid velocity within fluid flow channel 5 is determined from the known distance of the downstream thermal sensor, either 2 or 3, from the heating element 1 and the number of clock ticks between the pulse on the resistor and the interrupt at bridge nodes 16 or 17. The pressure differential between rooms 7 and 8 may be determined from the fluid velocity.

It is understood that various other modifications will be apparent to and can be readily made by those skilled in the art without departing from the scope and spirit of the present invention. Accordingly, it is not intended that the scope of the claims be limited to the description set forth herein, but rather that the claims be construed as encompassing all features of patentable novelty that reside in the present invention, including all features that would be treated as equivalents by those skilled in the art.

What is claimed is:

1. A fluid flow direction monitor having a fluid flow channel with a first opening and a second opening for detecting a presence of fluid flow in a specified fluid flow direction, said fluid flow direction and threshold velocity monitor comprising:

a first thermal sensor disposed within said fluid flow channel, said first thermal sensor having an electrical resistance that is a function of its temperature;

a second thermal sensor disposed within said fluid flow channel, said second thermal sensor distal to said first opening relative to said first thermal sensor, said second thermal sensor having an electrical resistance that is a function of its temperature;

a heated element disposed between said first and second thermal sensors in said fluid flow channel;

a bridge circuit having a first bridge arm comprising said first thermal sensor and a second bridge arm comprising said second thermal sensor;

a first voltage detection means electrically coupled to said first bridge arm for detecting voltage across said first thermal sensor and outputting a first output voltage proportional to the electrical resistance of the first thermal sensor;

a second voltage detection means electrically coupled to said second bridge arm for detecting voltage across said second thermal sensor and outputting a second output voltage proportional to the electrical resistance of said second thermal sensor;

a selection switch electrically coupled to said first voltage detection means and said second voltage detection means for selecting the specified fluid flow direction, said selection switch outputting a selected voltage and a nonselected voltage;

a differential amplifier means electrically coupled to said selection switch for amplifying the difference between said selected voltage and said nonselected voltage, said differential amplifier means outputting a first voltage;

an adjustable reference voltage source for supplying a stable reference voltage; and a comparison amplifier electrically coupled to the output of said differential amplifier means and said adjustable reference voltage source for outputting a first logic signal indicating whether said differential amplifier means output voltage is greater than said reference voltage, whereby said first logic signal indicates a presence of fluid flow in the specified fluid flow direction through the fluid flow channel.

2. The fluid flow direction monitor of claim 1 wherein said first thermal sensor and said second thermal sensor are thermistors.

3. The fluid flow direction monitor of claim 1, further comprising:

a printed circuit board forming a first wall of said fluid flow channel, said first thermal sensor, said second thermal sensor, and said heated element being mounted on said printed circuit board; and a channel cover having three walls, said channel cover being mounted on said printed circuit board, said channel cover covering said first thermal sensor, said second thermal sensor and said heater means, whereby said printed circuit board and said channel cover form said fluid flow channel.

4. The fluid flow direction monitor of claim 1 wherein said selection switch comprises a dip switch.

5. A fluid flow direction monitor having a fluid flow channel with a first opening and a second opening, said fluid flow direction monitor comprising:

a reference voltage source for supplying a stable reference voltage;

a first thermal sensor disposed within said fluid flow channel, said first thermal sensor having an electrical resistance that is a function of its temperature, said first thermal sensor having a first end and a second end, said first end being electrically coupled to ground;

a second thermal sensor disposed within said fluid flow channel, said second thermal sensor distal to said first opening relative to said first thermal sensor, said second thermal sensor having an electrical resistance that is a function of its temperature, said second thermal sensor having a first end electrically coupled to said second end of said first thermal sensor and a second end electrically coupled to said reference voltage source;

a heated element disposed between said first and second thermal sensors in said fluid flow channel;

a first differential amplifier having a first input electrically coupled to said first end of said second thermal sensor and a second input electrically coupled to said second end of said second thermal sensor for outputting a first voltage output proportional to said resistance of said second thermal sensor; and a second differential amplifier having a first input electrically coupled to said first differential amplifier and a second input electrically coupled to said second end of said first thermal sensor for outputting a first logic signal indicating whether said first voltage output is greater than a ground referenced voltage across said first thermal sensor, whereby said first logic signal indicates which of said first or said second thermal sensors is downstream from said heated element.

6. The fluid flow direction monitor of claim 5 wherein said first thermal sensor and said second thermal sensor are thermistors.

* * * * *